(12) United States Patent
Mast et al.

(10) Patent No.: US 7,063,497 B2
(45) Date of Patent: Jun. 20, 2006

(54) DRIVE OVER CONVEYOR PIT ASSEMBLY

(76) Inventors: Steve J. Mast, 7208 Highway 96 South, Payson, IL (US) 62360; Brent C. Mast, 310 N. Public St., Payson, IL (US) 62360

( * ) Notice: Subject to any disclaimer, the term of this patent is extended or adjusted under 35 U.S.C. 154(b) by 226 days.

(21) Appl. No.: 10/361,050

(22) Filed: Feb. 6, 2003

(65) Prior Publication Data

US 2003/0170103 A1 Sep. 11, 2003

Related U.S. Application Data

(63) Continuation-in-part of application No. 10/092,290, filed on Mar. 6, 2002, now Pat. No. 6,966,740.

(51) Int. Cl.
*B65G 67/00* (2006.01)

(52) U.S. Cl. ............... 414/572; 414/385; 414/399; 414/582; 414/226.04; 198/302; 198/312

(58) Field of Classification Search ............ 414/226.04, 414/572–574, 474, 476, 582, 385, 397, 399, 414/401; 198/302; 280/43, 43.17, 43.22, 280/414.5
See application file for complete search history.

(56) References Cited

U.S. PATENT DOCUMENTS

| | | | |
|---|---|---|---|
| 2,632,556 A | 3/1953 | Alpers et al. | |
| 2,844,240 A | 7/1958 | Buck | |
| 3,067,858 A | 12/1962 | Loosii | |
| 3,154,189 A | 10/1964 | O'Hanlon et al. | |
| 3,198,320 A | 8/1965 | Mayrath et al. | |
| 3,378,152 A * | 4/1968 | Warner | 414/574 |
| 3,587,834 A | 6/1971 | Dugge et al. | |
| 3,895,702 A | 7/1975 | Newsom | |
| 4,063,745 A * | 12/1977 | Olson | 280/43.23 |
| 4,603,775 A | 8/1986 | Plett | |
| 4,813,839 A | 3/1989 | Compton | |
| 4,963,066 A | 10/1990 | Boppart | |
| 5,297,914 A * | 3/1994 | Ash | 414/574 |
| 5,492,217 A | 2/1996 | Stewart | |
| 5,964,566 A | 10/1999 | Stewart et al. | |
| 6,119,847 A | 9/2000 | Mooney et al. | |
| 2004/0136817 A1* | 7/2004 | Kirsch | 414/376 |

OTHER PUBLICATIONS

Advertising Brochure; Westfield MK100-91 and MK130-91; Westfield Industries Ltd., Jan., 1997.
Advertising Brochure; Westfield RampOver, Westfield Industries Ltd., Dec. 2000.
Advertising Brochure; "Westfield MK Swing-Hopper Grain Augers MK 80, MK100, MK130" Westfield Industries Ltd., Apr., 1997.

(Continued)

*Primary Examiner*—Khoi H. Tran
(74) *Attorney, Agent, or Firm*—Armstrong Teasdale LLP

(57) ABSTRACT

A drive over conveyor pit assembly includes a mainframe including a grain pit located between and adjacent a plurality of drive over sections. Attached to the mainframe are a plurality of entrance ramps and a pair of exit ramps. Each ramp is pivotably attached to an end of the drive over sections. The drive over conveyor pit assembly includes a drive over pit coupled to a grain conveyor in such a configuration to be transported with the main grain conveyor by a single tow vehicle. The assembly includes a drive over conveyor pit hydraulically positioned for transportation.

12 Claims, 16 Drawing Sheets

OTHER PUBLICATIONS

Advertising Brochure; "Wheatheart Farm Grain Handling Accessories"; Wheatheart Manufacturing Ltd., Jan., 2001.

Advertising Brochure; "It's a Grain Moving Merger!" 14" Drive Over Hopper/End Driver Auger Combination, Feterl Mfg. Co., Aug. 4, 2001.

Advertising Brochure; "Get the "Low Down" from Feterl Mfg." Hoppers, Feterl Mfg. Co., Apr., 2001.

Advertising Brochure; "Quick-Pit Drive-Over Auger", Adrian Mfg. Inc.

Advertising Brochure; "Drive-Over Hopper" Sukup Manufacturing Company.

* cited by examiner

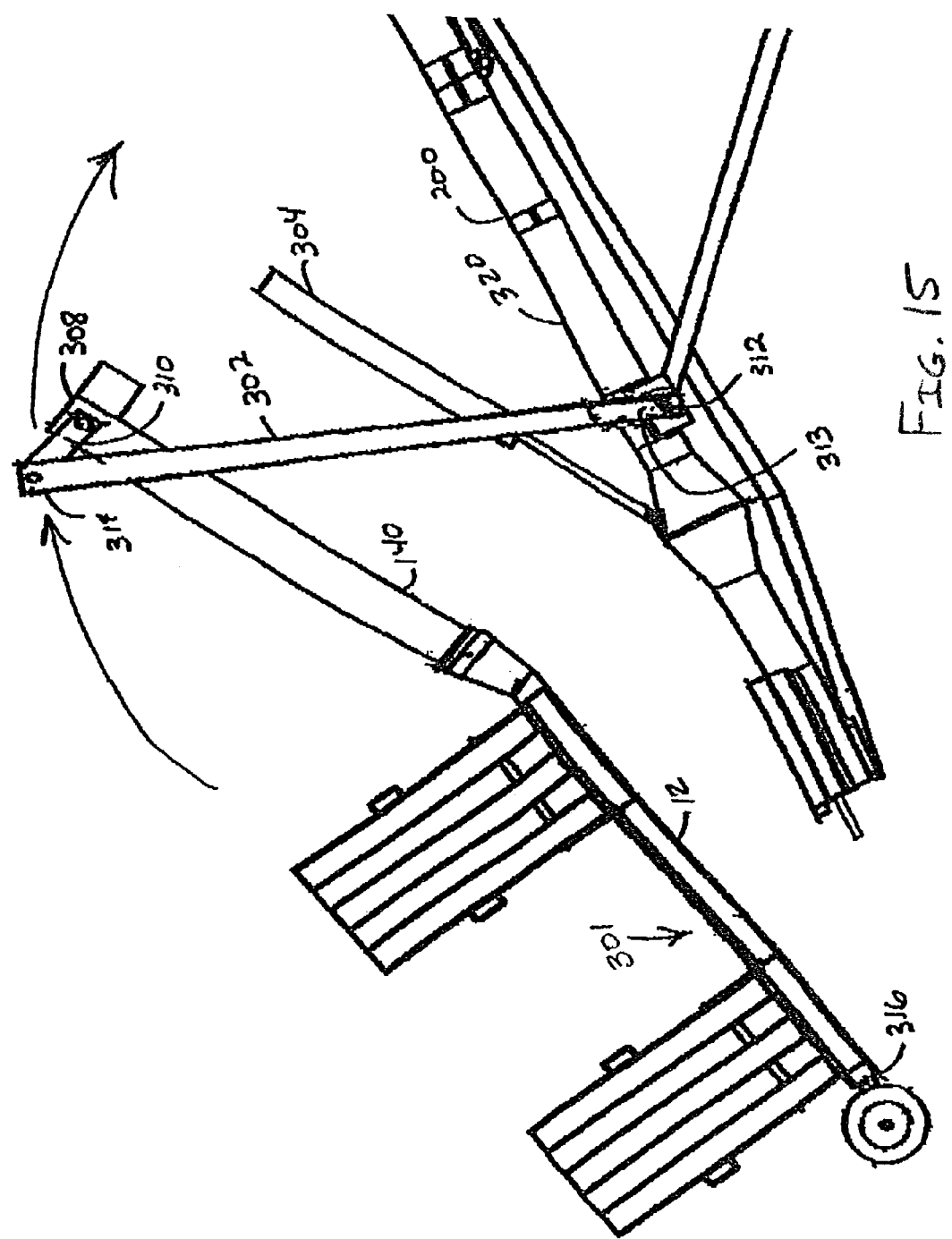

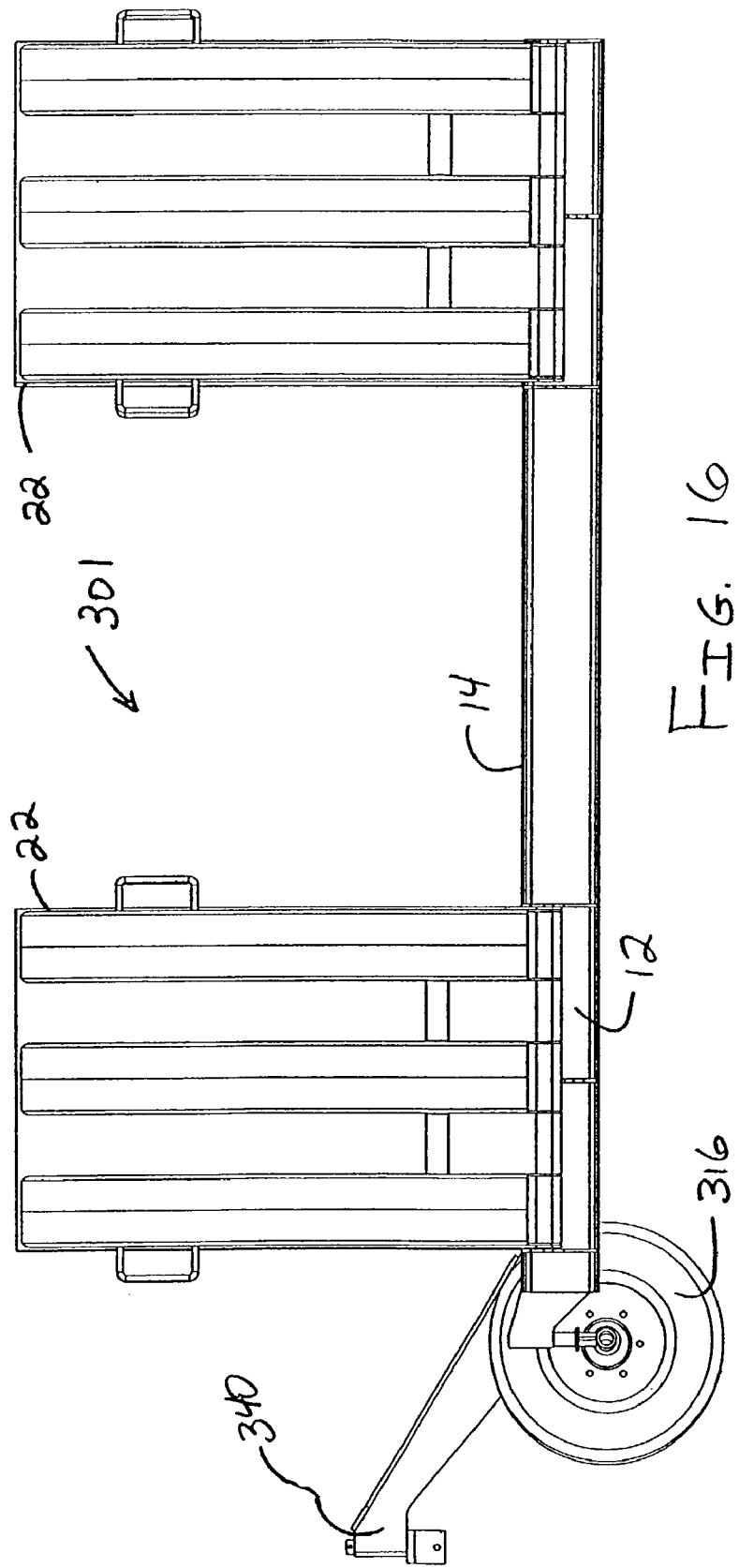

DRIVE OVER CONVEYOR PIT ASSEMBLY

CROSS REFERENCE TO RELATED APPLICATIONS

This application is a continuation-in-part of U.S. patent application Ser. No. 10/092,290 filed Mar. 6, 2002 now U.S. Pat. No. 6,966,740.

BACKGROUND OF THE INVENTION

This invention relates generally to movement of grain, and more specifically to, an apparatus and method for movement of grain for transportation and storage.

Common fixtures for storing grain include grain silos and grain bins. Once the grain is harvested, the grain is moved from the field to the grain bin in a truck or hopper bottom trailer. The most common auger configuration includes a main auger positioned at an incline, attached to the hitch of a tractor at the lower end and the upper end discharging into the grain storage fixture. Along with the main auger, another shorter auger is attached to a swing away hopper that is positioned behind the truck or under the hopper bottom trailer. A discharge end of the short auger is attached at an inlet of the main auger. However the swing away hoppers have some disadvantages. For example, some known swing away hoppers require the wheels of the bottom hopper trailer to pass by, then the hopper and short auger combination is manually positioned under the hopper bottom trailer. In such a configuration, there can be a number of iterations of trailer, hopper and auger movement before positioning is correct to begin movement of grain from the trailer to the grain silo or bin.

Some drive over conveyor pits which incorporate frame and ramp assemblies are known. However these drive over pits have a disadvantage in that manual adjustment is required to raise and lower the frame and ramp assembly with respect to the ground. Another major disadvantage is that some drive over conveyor pits require an additional tractor or transport vehicle to move the pit from one location to another. One vehicle for the main incline auger and another for the drive over pit.

BRIEF SUMMARY OF THE INVENTION

In one embodiment, a drive over conveyor pit is provided which comprises a mainframe which further comprises a grain pit located between and adjacent to a plurality of drive over sections. The drive over conveyor pit further comprises a plurality of entrance ramps pivotably attached to a first end of each of the drive over sections and a plurality of exit ramps pivotably attached to a second end of each of the drive over sections. Further, a hydraulic front lift assembly is attached to a front of the mainframe, and a hydraulic rear lift assembly is attached to a rear of the mainframe.

In another embodiment, a hydraulic lift assembly for a drive over conveyor pit is provided. The assembly comprises a plurality of axle frames configured to be pivotably mounted to the drive over conveyor pit and a plurality of caster wheel assemblies configured to be rotatably mounted to the axle frames, one caster wheel assembly per axle frame. The assembly further comprises a plurality of tires configured to be mounted to the caster wheel assemblies and a hydraulic piston system comprising at least one hydraulic piston. The system is attached to the axle frames and configured to cause the drive over conveyor pit to be raised and lowered through extension and retraction of the piston, extension and retraction of the piston causing the axle frames to pivot at the mounting to the pit.

In still another embodiment, a grain transfer system is provided which comprises a drive over conveyor pit and a grain auger. The grain auger includes a feed chute. The drive over conveyor pit comprises a mainframe comprising a grain pit located between and adjacent to a plurality of drive over sections, and entrance and exit ramps pivotably attached to the drive over sections. A front of the mainframe is configured for mechanical attachment to the feed chute. The drive over conveyor pit comprises a hydraulic front lift assembly attached to the front of the mainframe and a hydraulic rear lift assembly attached to a rear of the mainframe.

In yet another embodiment, a grain transfer system comprises a drive over conveyor pit and a grain auger comprising a feed chute. The drive over pit comprises a grain pit located between and adjacent to a plurality of drive over sections and entrance and exit ramps pivotably attached to the drive over sections. The grain transfer system further comprises a mechanical linkage intermediate the auger and a discharge end of the feed chute. The feed chute is mechanically attached to the drive over conveyor pit and the mechanical linkage is configured to raise the feed chute and the drive over conveyor pit above a portion of the grain auger for transport.

In a further embodiment, a front lift assembly for a drive over conveyor pit is provided. The assembly comprises an axle assembly, a cylinder linkage attachment, and a hydraulic cylinder extending between and attached to the axle assembly and the cylinder linkage attachment. A transition housing is configured to be attached to a mainframe of the drive over conveyor pit and a plurality of caster wheel assemblies, having tires mounted thereon are configured to be rotatably mounted to the ends of the axle assembly. The front lift assembly further comprises a plurality of linkage arms that are pivotably attached to the axle assembly and the transition housing. At least one of the linkage arms is also attached to the cylinder linkage attachment. In operation, retracting the hydraulic cylinder causes a distance between the axle assembly and the cylinder linkage attachment to decrease due to the pivoting of the linkage arms, causing the mainframe to lower with respect to the tires. Extending the hydraulic cylinder causes a distance between the axle assembly and the cylinder linkage attachment to increase due to the pivoting of the linkage arms, causing the mainframe to rise with respect to the tires.

BRIEF DESCRIPTION OF THE DRAWINGS

FIG. 15 is a view illustrating operation of mechanical linkage in regard to movement of a drive over conveyor pit.

FIG. 16 is a side view of a drive over conveyor pit illustrating a hitching mechanism.

DETAILED DESCRIPTION OF THE INVENTION

Figure 1:
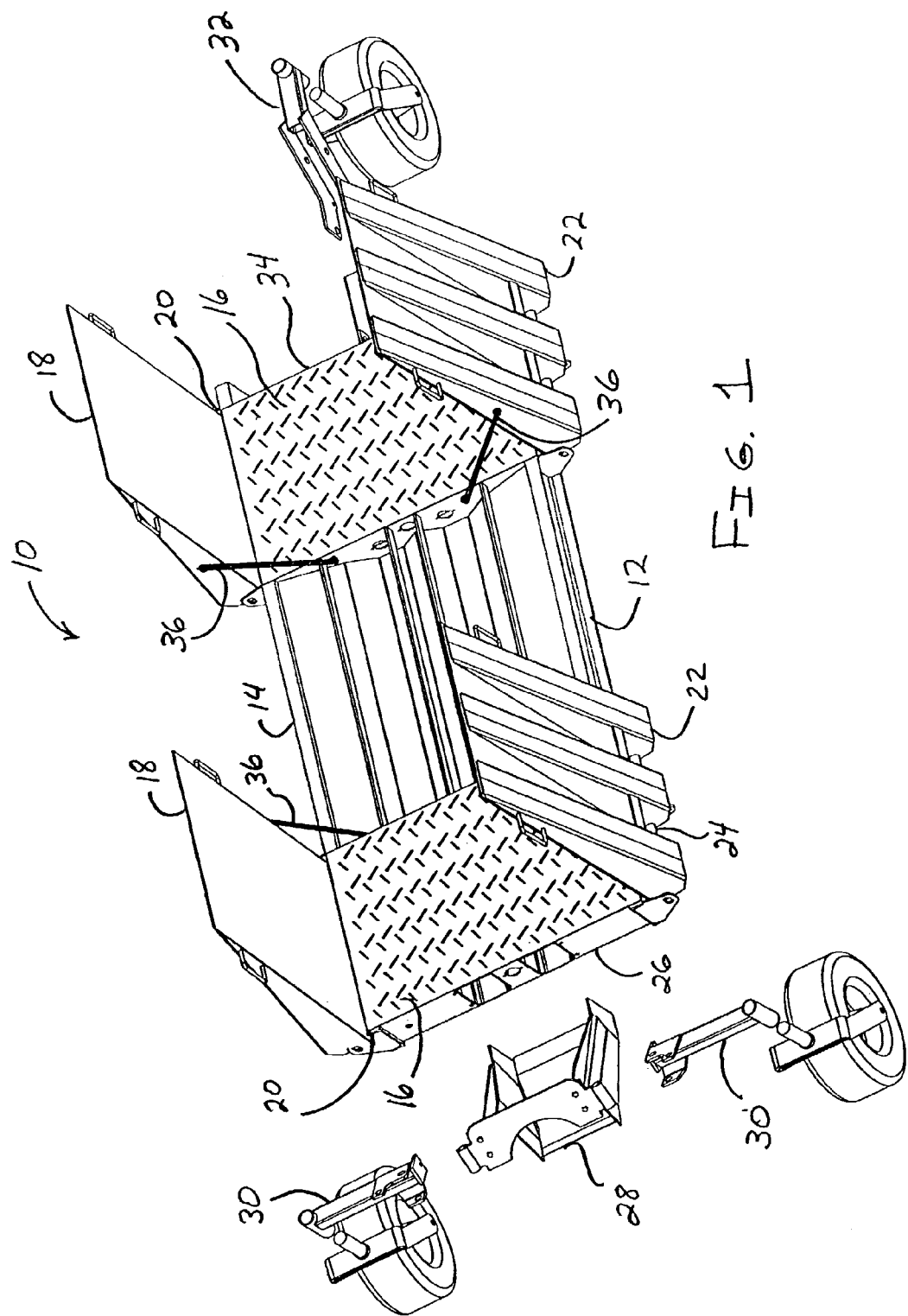
FIG. 1 is a partially assembled view of a drive over conveyor pit.

FIG. 1 is a partially assembled view of one embodiment of a drive over conveyor pit 10. Pit 10 includes a mainframe 12 which includes a grain pit 14 located between and adjacent to drive over sections 16. A pair of entrance ramps 18 are pivotably attached to a first end 20 of each of drive over sections 16. A pair of exit ramps 22 are pivotably attached to a second end 24 of each of drive over sections 16.

At a front end 26 of mainframe 12, a transition housing 28 is attached. A hydraulic front lift assembly 30 (hydraulics not shown in FIG. 1) is attached to transition housing 28. A hydraulic rear lift assembly 32 is attached to a rear end 34 of mainframe 12. Transport braces 36 are configured to attach to and retain ramps 18 and 22 in a lifted position for transport.

Figure 2:
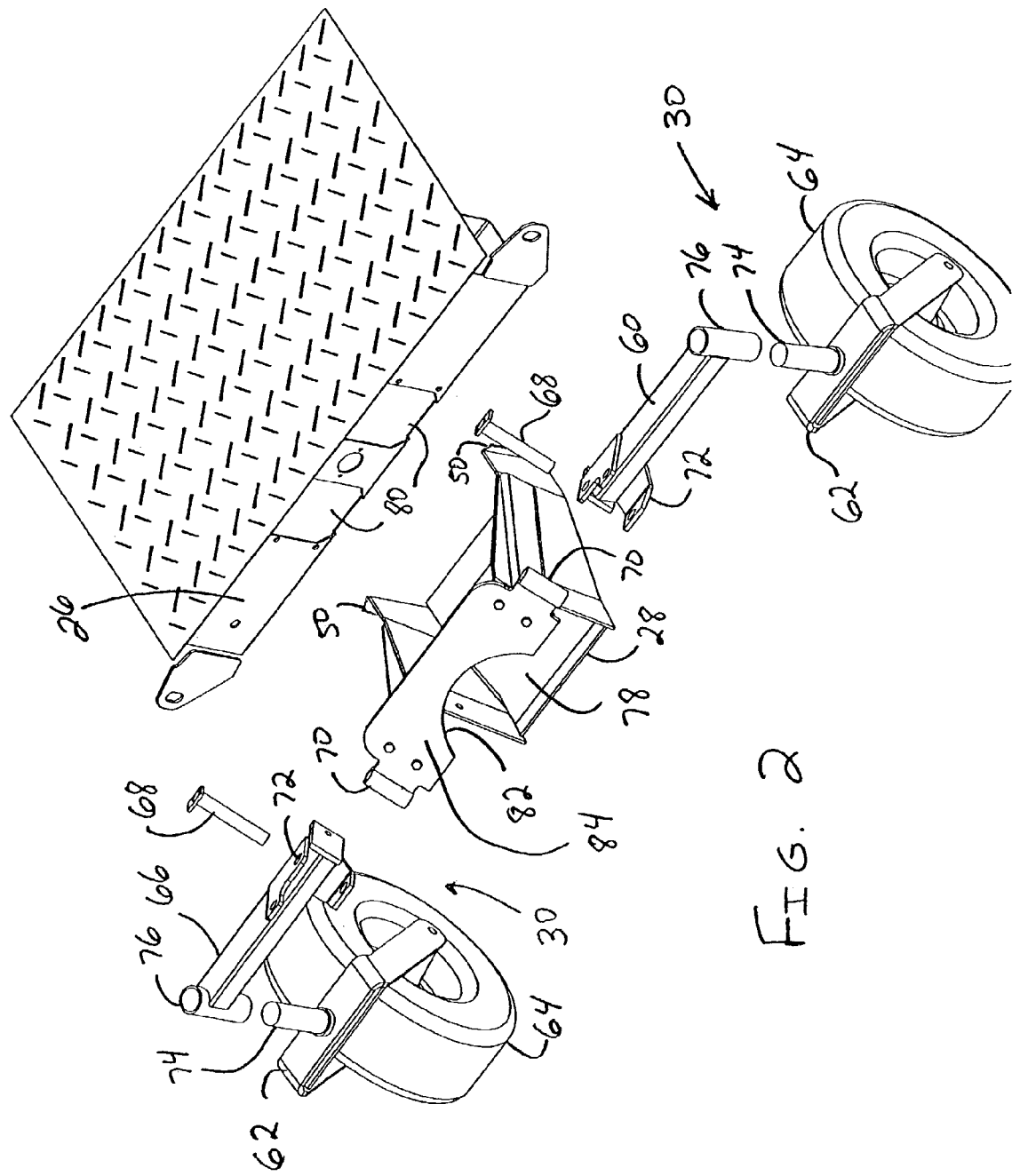
FIG. 2 is an exploded view of a front lift assembly.

FIG. 2 is an exploded view of front lift assembly 30, transition housing 28 and mainframe front 26. Transition housing 28 is configured to be connected with mainframe front 26 through flanges 50. In one embodiment, transition housing 28 is bolted to mainframe 26. In an alternative embodiment, transition housing 28 is welded to mainframe 26.

Front lift assembly 30 is attached to transition housing 28 and includes a right axle frame 60, a caster wheel assembly 62, and a tire 64. Assembly 30 further includes a left axle frame 66, a caster wheel assembly 62, and a tire 64. Right axle frame 60 and left axle frame 66 are attached to transition housing 28, in one embodiment, using pivot pins 68 which are inserted through a sleeve 70 located on a first end of axle subframe 84 and an attachment member on an end of each of right axle frame 60 and left axle frame 66. Tires 64 are attached to wheel forks 62 as known in the art. Caster wheel assemblies 62 include a mounting pin 74 which is inserted into a sleeve 76 at an end of axle frames 60 and 66 opposite the end which includes sleeve 70. Pin 74 and sleeve 76 from a freely rotating, or pivoting, coupling. Pin 68 and sleeve 70 and attachment member 72 also from a pivoting coupling. The two couplings allow mainframe 12 to be lowered to the ground and tires 64 to be lifted and moved away from mainframe 12 using hydraulics as explained below. Connection of transition housing 28 to mainframe front 26 aligns housing plate 78 with grain feed holes 80. When drive over conveyor pit 10 is in operation, grain is fed through feed holes 80 and into an auger (not shown), whose feeding mechanism attaches to housing plate 78 and under a semi circular recess 82 of axle subframe 84. Wheel assemblies other than caster wheel assembly 62 are contemplated.

Figure 3:
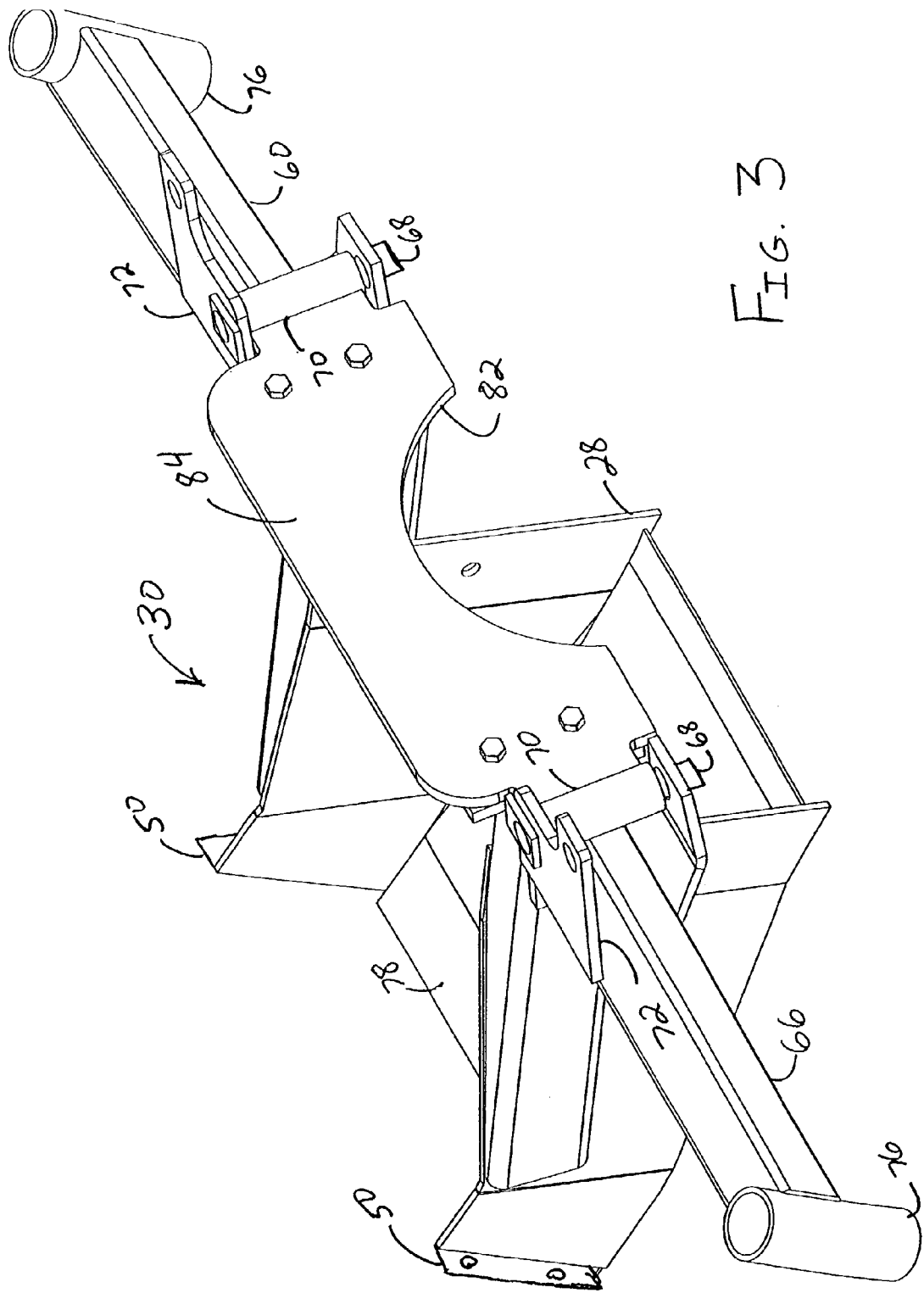
FIG. 3 is a perspective view of a portion of the front lift assembly of FIG. 2 in a extended position.
Figure 4:
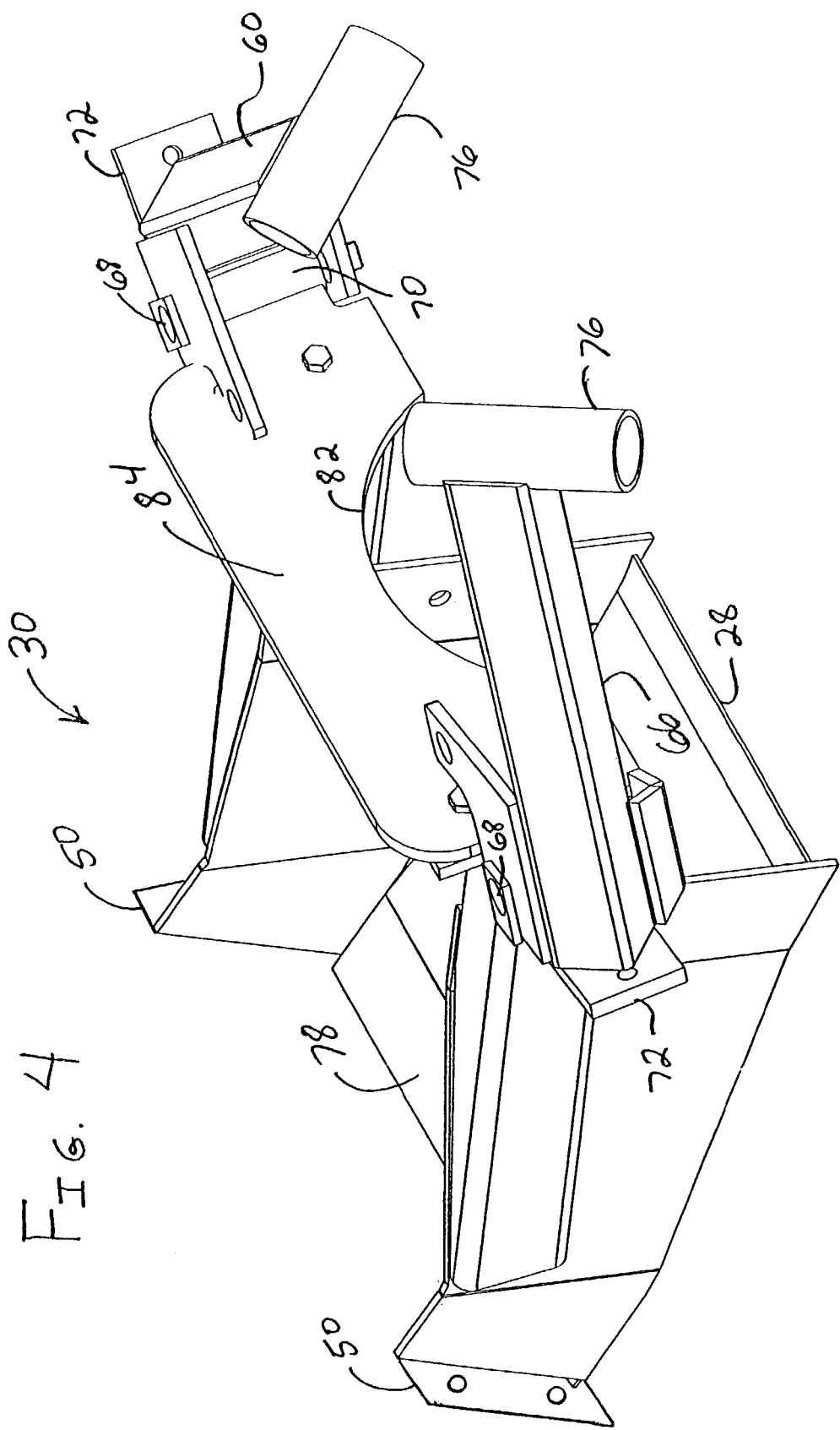
FIG. 4 is a perspective view of the portion of the front lift assembly of FIG. 2 in a retracted position.

FIG. 3 is a perspective view of a portion of front lift assembly 30 in an extended position. FIG. 4 is a perspective view of the portion of front lift assembly 30 in a retracted position. Components in FIGS. 3 and 4, identical to components shown in FIG. 2 are identified in FIGS. 3 and 4 using the same reference numerals used in FIG. 2. FIG. 3 illustrates that in a raised position, sleeves 76 are positioned perpendicularly to the ground. In such a position, caster wheel assemblies 62 and tires 64 are positioned for ground contact, and in conjunction with the aforementioned hydraulics, cause mainframe 12 to be lifted for transport.

Alternatively, and referring to FIG. 4, front lift assembly 30 is shown in a retracted position. To assume the retracted position, the hydraulics cause axle frames 60 and 66 to pivot at pin 68 and sleeve 70. Further, axle frames 60 and 66 are configured such that, as they pivot, sleeves 76 begin to move from a perpendicular position, and mainframe 12 (shown in FIG. 1) begins to be lowered to the ground. Once mainframe assumes ground contact, axle frames 60 and 66 continue to pivot, based upon the travel of the hydraulic system used, to a point where sleeves 76 are at an angle between perpendicular and horizontal. In one embodiment, the angle from perpendicular is about 40 degrees, thereby causing tires 64 to raise from the ground.

The above is reversed when moving from a retracted position to an extended position. The hydraulics cause axle frames 60 and 66 to again pivot at pin 68 and sleeve 70. As axle frames 60 and 66 pivot, sleeves 76 begin to move from the angular position towards the perpendicular position, causing tires 64 to come into ground contact, which, based upon the configuration of axle frames 60 and 66 causes a lifting of mainframe 12 (shown in FIG. 1) from the ground. Axle frames 60 and 66 continue to pivot, based upon the travel of the hydraulic system used, to a point where sleeves 76 are perpendicular to the ground and mainframe 12 is in a fully raised position, ready for transport.

Figure 5:
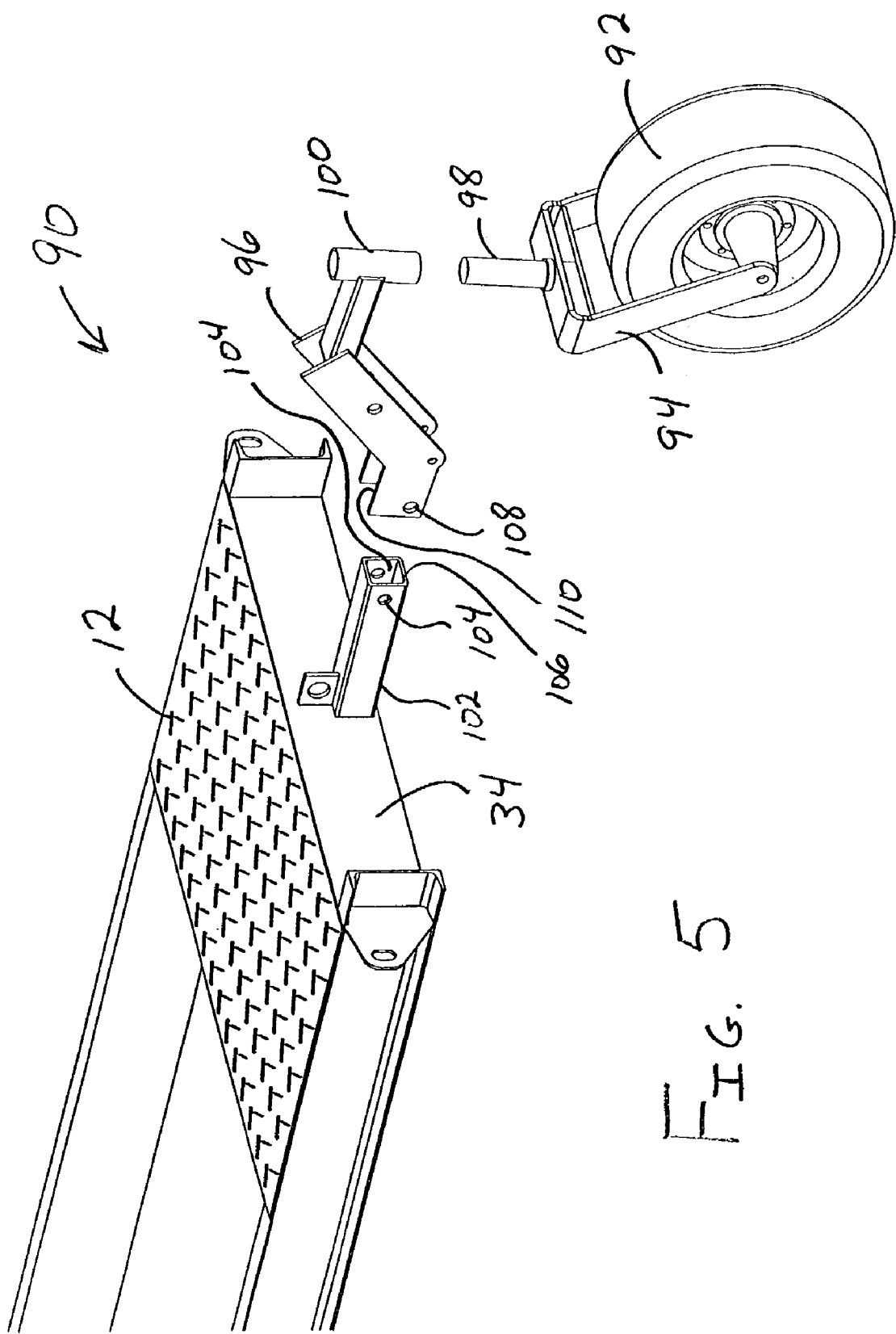
FIG. 5 is a perspective view of a rear lift assembly.

FIG. 5 is a perspective view of rear lift assembly 90. Assembly 90 includes a tire 92 to which is connected a caster wheel assembly 94. Caster wheel assembly 94 is attached to an axle frame 96 using a pin 98 and sleeve 100 assembly to provide a freely rotating coupling. Axle frame 96 is pivotably connected to rear end 34 of mainframe 12 through an attachment member 102, which in one embodiment, is non-movably attached to rear end 34 of mainframe 12. In one embodiment, attachment member 102 is welded to rear end 34 of mainframe 12. In an alternative embodiment, attachment member 102 is molded as part of rear end 34 of mainframe 12. In still another alternative embodiment, Attachment member 102 is configured with a flange which is bolted to rear end 34 of mainframe 12.

Axle frame 96 is pivotably attached to attachment member 102 through any of a variety of attachment means as known in the art. In the embodiment shown, a plurality of holes 104 in an end portion 106 of attachment member 102, and a plurality of holes 108 in an end portion 110 of axle frame 96, are configured to align as end portion 106 of attachment member 102 is slidably engaged with end portion 110 of axle frame 96. An attachment means, for example, a pin, extends through aligned holes 104 and 108 to secure attachment member 102 to axle frame 96. In the embodiment, the pin is held in place, for example, with cotter pins, or clips attached to the pin. In an alternative embodiment, the pin is configured with a flange on one end, and a second end is retained using the cotter pin or clip.

Axle frames 60, 66, and 96, in one specific embodiment, are configured for attachment to hydraulically driven pistons (not shown in FIGS. 1, 2, or 5). When the pistons are in an extended position, axle frames 60, 66, and 96 are forced into a position such that mainframe 12 is lift from the ground, thereby enabling transport. By retracting the pistons, axle frames 60, 66, and 96 are forced to pivot with respect to axle subframe 84 and attachment member 102, thereby allowing mainframe 12 to lower to the ground for an intended usage. Once mainframe 12 comes into contact with the ground, the pivoting of axle frames 60, 66, and 96 continues, thereby causing tires 64, and 92 to be raised and positioned out of the way of grain truck operators and other users. Those skilled in the art will appreciate that other embodiments of hydraulically driven piston arrangements are possible, including a single piston for both of front axle frames 60 and 66. Alternatively, hydraulics are also configurable such that extending the piston causes mainframe 12 to be lowered and retraction of pistons cause tires 64 and 92 to come into ground contact thereby lifting mainframe 12 for transport.

Figure 6:
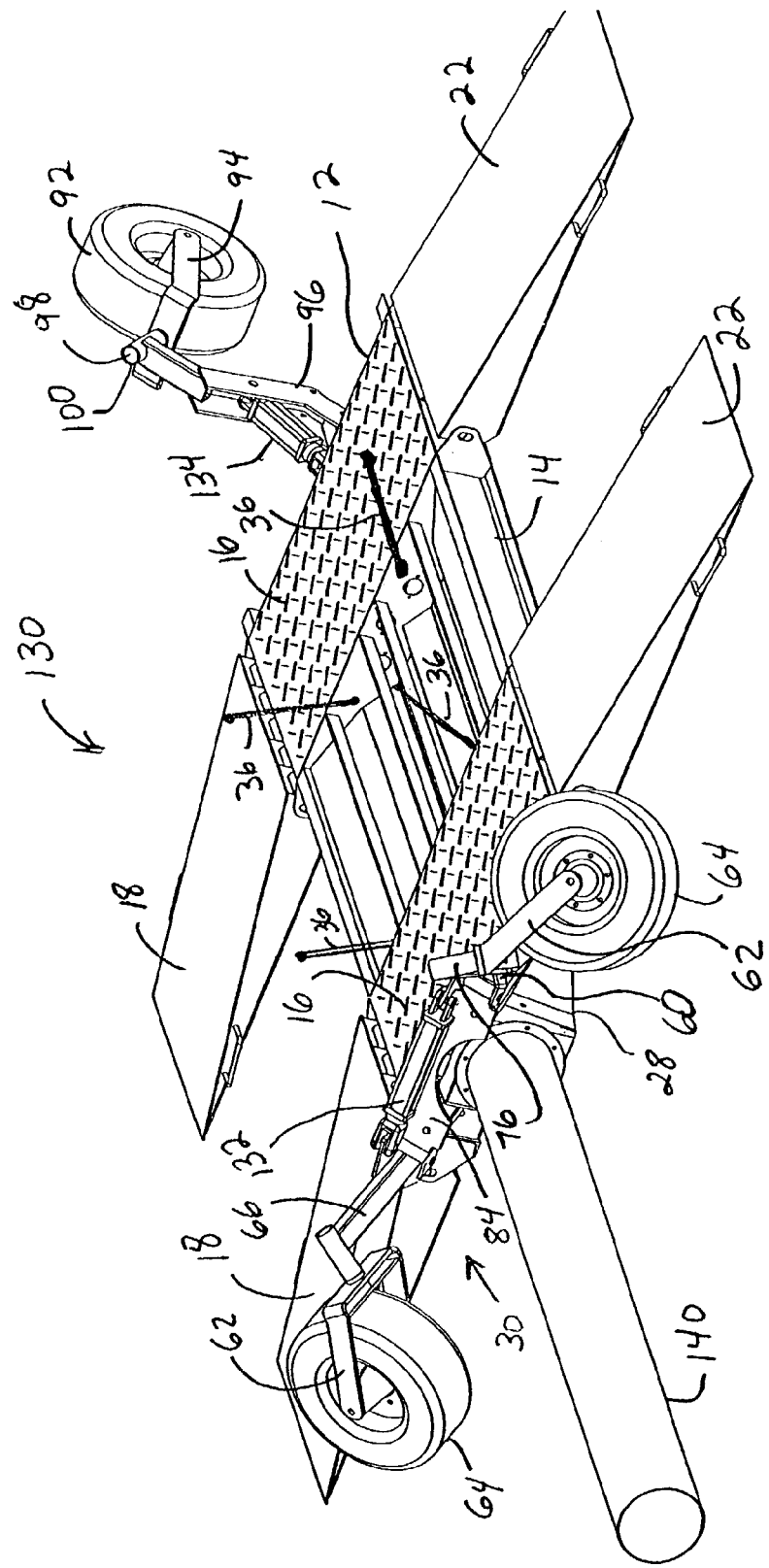
FIG. 6 is a perspective view of a drive over conveyor pit in a lowered position.

FIG. 6 is a perspective view of one embodiment of a drive over conveyor pit 130 in a lowered position. Components in FIG. 6, identical to components shown in FIGS. 1, 2, or 5 are identified in FIG. 6 using the same reference numerals used in those Figures. Pit 130, in the embodiment shown, includes a front hydraulic piston 132 which is configured to cause front lift assembly 30 to operate as above described for raising and lowering at least a portion of mainframe 12. A rear hydraulic piston 134 is configured cause rear lift assembly 90 to operate as above described, also for raising and lowering at least a portion of mainframe 12. Hydraulic connections to, for example, a hydraulic drive system of a tractor, is not shown.

Referring to front lift assembly 30 as shown in FIG. 6, it is appreciated that axle frames 60 and 66 are configured to raise tires 64 in both a vertical and forward direction. Such a configuration allows pit 130, more specifically, front lift assembly 30, to assume a lower profile when in position for intended use (e.g. lowered). A connection from transition housing 28 to a feed chute 140, for example, a mechanical connection to a power take-off of a tractor, is also shown. Feed chute 140 is also configured to mechanically attach to a main conveyor (shown in FIG. 12) of a grain auger to move grain from pit 14 through chute 140 to the grain auger for final disposition of the grain.

Figure 7:
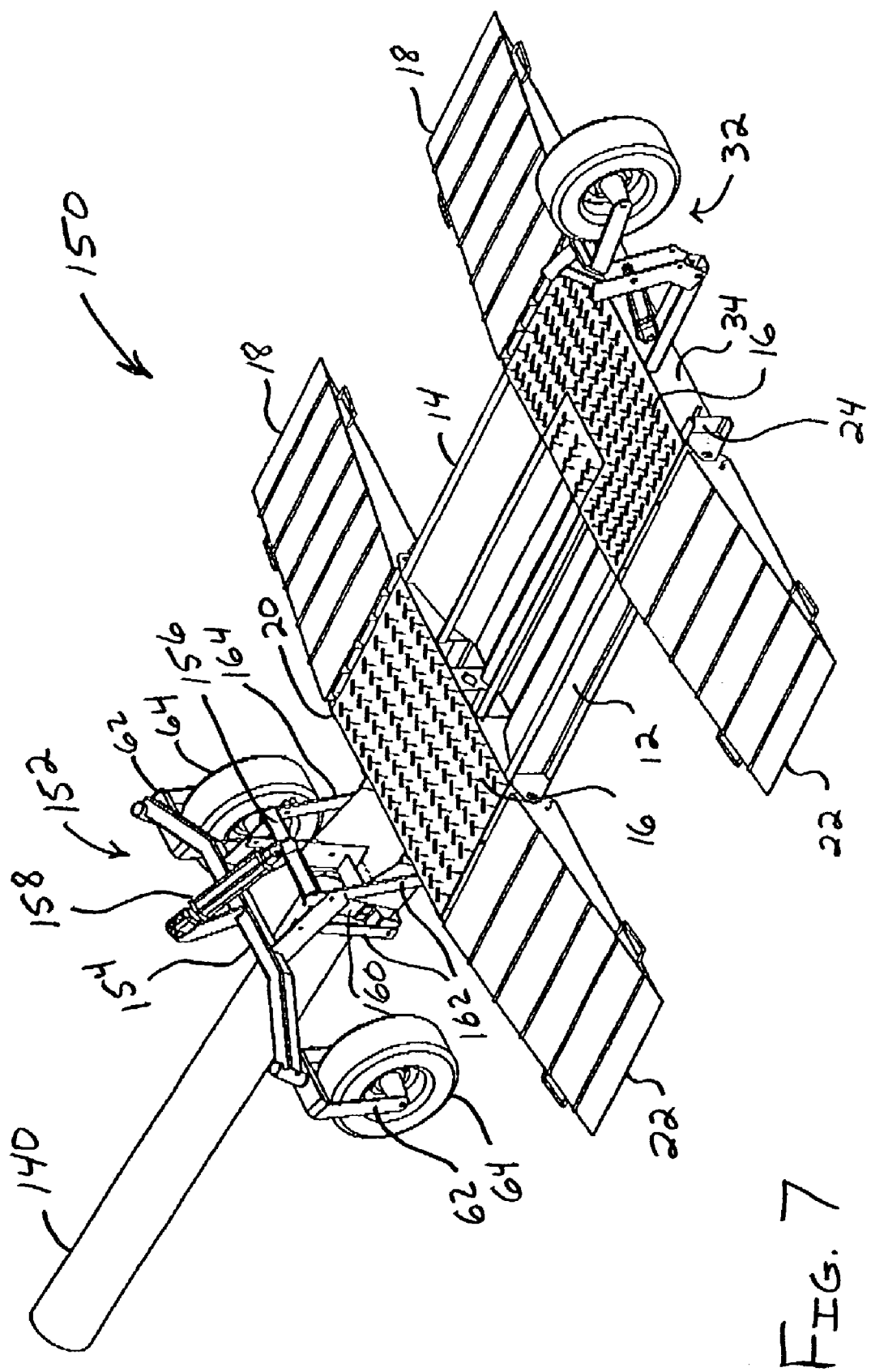
FIG. 7 is a perspective view of another drive over conveyor pit.

FIG. 7 illustrates an alternative embodiment of a drive over conveyor pit 150. Elements in FIG. 7 that are the same as elements in FIG. 1, are identifying using the same reference numerals. Pit 150 is similar to pit 10 (shown in FIG. 1) in that pit 150 includes mainframe 12 which includes grain pit 14 located between and adjacent drive over sections 16. Entrance ramps 18 are pivotably attached to first end 20 of each of drive over sections 16, and exit ramps 22 are pivotably attached to second end 24 of each of drive over sections 16. Hydraulic rear lift assembly 32 is attached to rear end 34 of mainframe 12. Pit 150 further includes a front lift assembly 152.

Front lift assembly 152 includes an axle assembly 154, a cylinder linkage attachment 156, a hydraulic cylinder 158, a transition housing 160, a pair of left linkage arms 162, and a pair of right linkage arms 164. Front lift assembly 152 further includes a pair of caster wheel assemblies 62 on which tires 64 are mounted. Caster wheel assemblies 62 engage axle assembly 154 as further described below. In alternative embodiments, other wheel assemblies may be utilized instead of caster wheel assemblies 62 and tires 64. Feed chute 140 is connected to mainframe 12 for the movement of grain.

Figure 8:
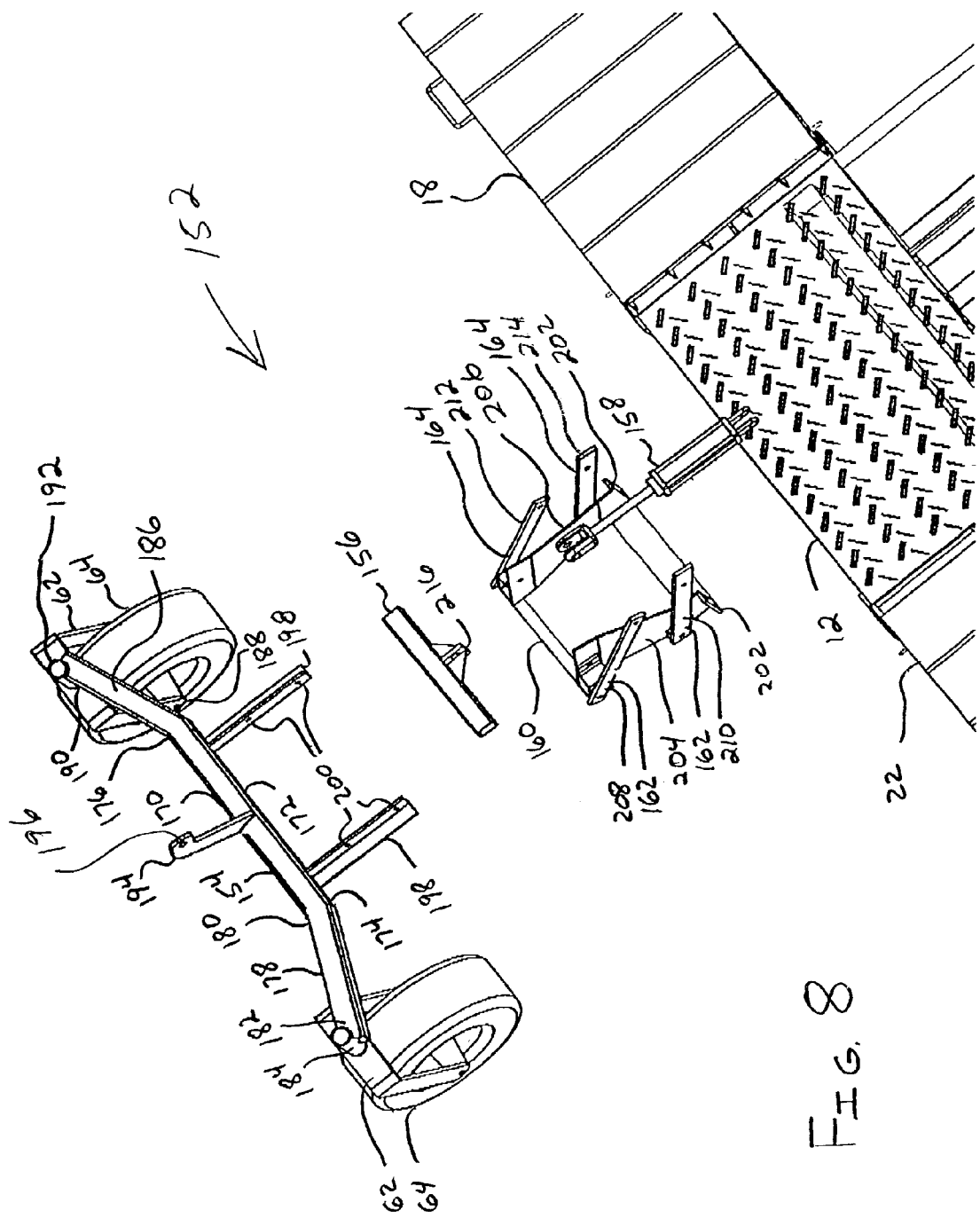
FIG. 8 is an exploded view of a front lift assembly for the drive over conveyor pit of FIG. 7.

FIG. 8 is an exploded view of front lift assembly 152 of drive over conveyor pit 150 (shown in FIG. 7). Front lift assembly 152 includes axle assembly 154 which includes a main member 170. Main member 170 has a center portion 172 having a first end 174 and a second end 176. A left extension 178 extends at a slight angle from first end 174 of center portion 172 at a first end 180 and includes a second end 182, which, in one embodiment includes a sleeve 184 for mounting of caster wheel assembly 62. A right extension 186 extends at a slight angle from second end 176 of center portion 172 at a first end 188 and includes a second end 190, which, in one embodiment includes a sleeve 192 for mounting of a second caster wheel assembly 62.

A cylinder mounting member 194 extends from center portion 172 of main member 170. Cylinder mounting member 194 extends upward from center portion 172 and includes a mounting hole 196, which is utilized to mount one end of hydraulic cylinder 158. A pair of linkage arm attachment members 198 also extend from main member 170. One member 198 extends from main member 170 near first end 174 and the other member 198 extends from main member 170 near second end 176. Linkage arm attachment members 198 extend at an angle from main member 170, and in one embodiment are at an angle between 90 and 180 degrees from cylinder mounting member 194. Each member 198 includes a pair of holes 200 therethrough to which linkage arms 162 and 164 are pivotably attached.

In one embodiment, axle assembly 154 is manufactured as a one piece unit which includes center portion 170, extensions 178, 186, sleeves 184, 192, cylinder mounting member 194, and linkage arm attachment members 198. Such a unit is manufactured utilizing a variety of known manufacturing methods including molding or forging using steel, iron or other metals and alloys. In an alternative embodiment, member 170 is assembled from discrete parts, including discrete parts for at least some of the above listed components, and fastened together with known fastening methods.

Transition housing 160 provides attachment for front lift assembly 152 to mainframe 12. In one embodiment, flanges 202 are bolted onto mainframe 12, although other attachment methods can be utilized. Transition housing 160, in the embodiment shown, is essentially a rectangular framework having a left side 204 to which left linkage arms 162 are pivotably attached, and a right side 206 to which right linkage arms 164 are pivotably attached.

In one embodiment, left linkage arms 162 include a forward left linkage arm 208, and a rear left linkage arm 210. Also, right linkage arms 164 include a forward right linkage arm 212, and a rear right linkage arm 214. In addition to attaching to transition housing 160 and linkage arm attachment members 198, rear left linkage arm 210 and rear right linkage arm 214 are configured for a third pivoting attachment which is a pivoting attachment to cylinder linkage attachment 156. In one embodiment, rear left linkage arm 210 and rear right linkage arm 214 are welded to cylinder linkage attachment 156.

Cylinder linkage attachment 156 includes a cylinder attachment portion 216 to attach an opposite end of hydraulic cylinder 158. Operation of cylinder 158 causes a movement of main member 170 with respect to transition housing 160, and therefore a movement with respect to mainframe 12, based upon the pivoting attachments of linkage arms 162 and 164. The result of such movement is a lifting or a lowering of mainframe 12, based on a ground surface contact of tires 64. Such operation is illustrated in FIGS. 9 and 10.

Figure 9:
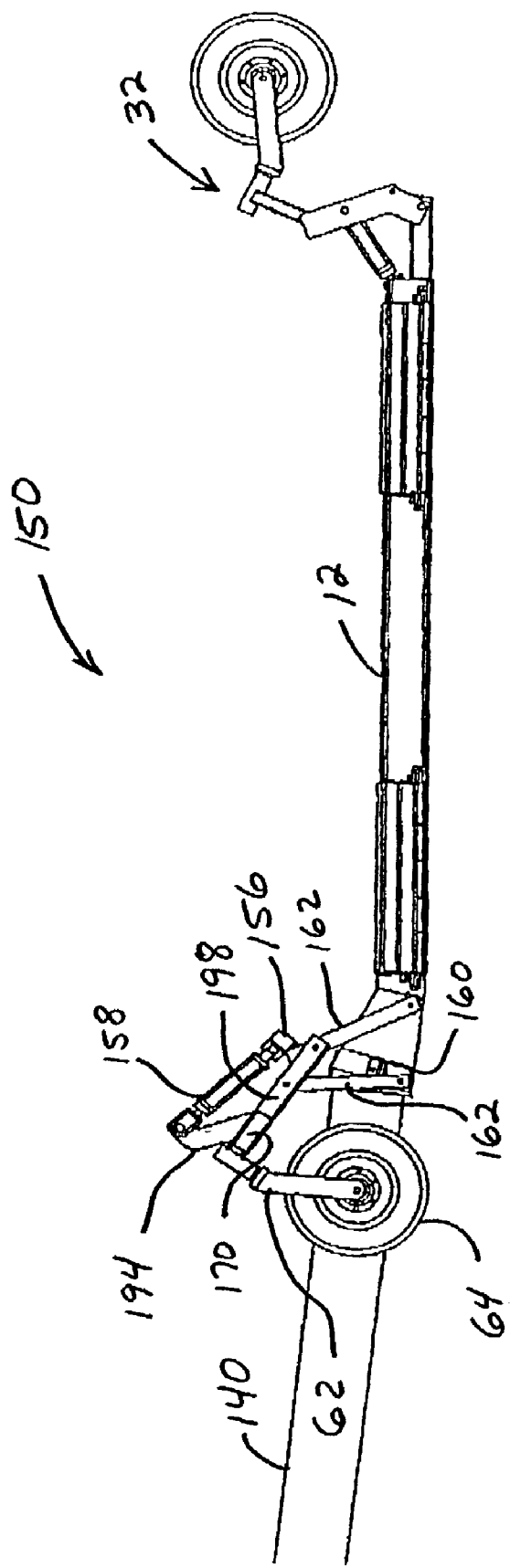
FIG. 9 is a side view of the drive over conveyor pit of FIG. 7 in a lowered position.

FIG. 9 is a side view of drive over conveyor pit 150 in a lowered position. As hydraulic cylinder 158 is retracted, the pivoting action of linkage arms 162, 164 (linkage arms 164 not shown) causes a distance between cylinder mounting member 194 and cylinder linkage attachment 156 to decrease. The result of the above described pivoting action is that mainframe 12 lowers with respect to tires 64, and once mainframe 12 makes ground contact, continued pivoting action causes tires 64 to be lifted from the ground surface. A similar action occurs with rear wheel assembly 32 as is described above.

Figure 10:
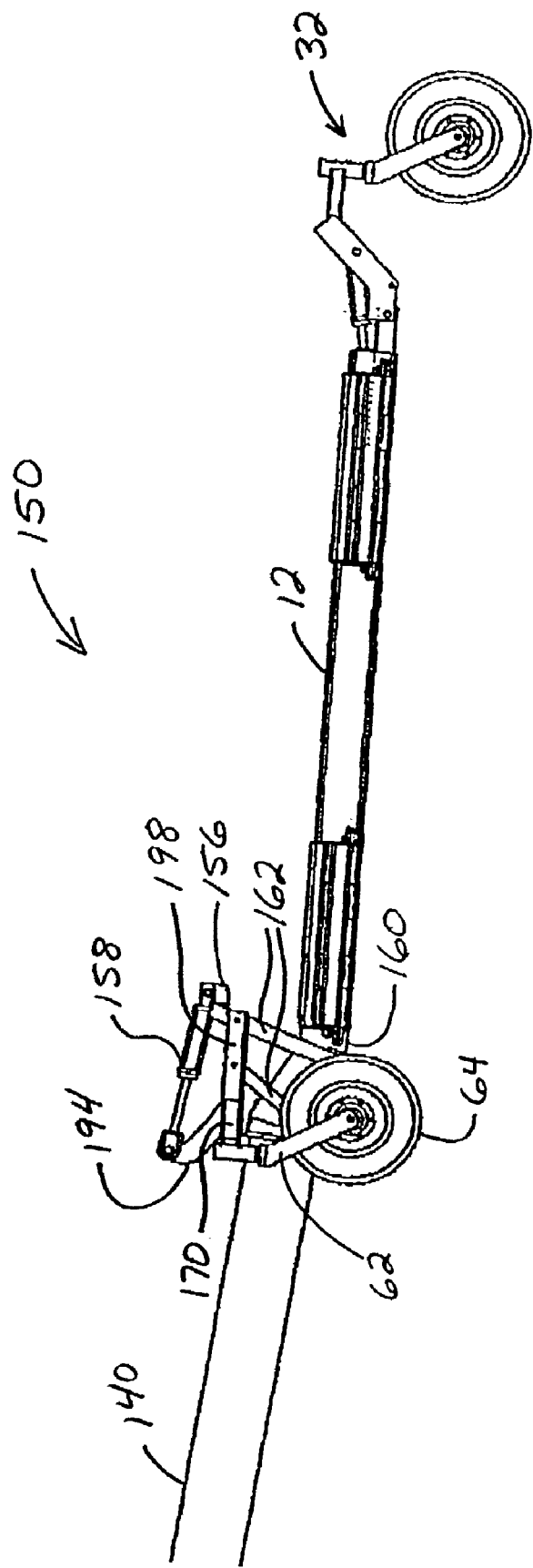
FIG. 10 is a side view of the drive over conveyor pit of FIG. 7 in a raised position.

FIG. 10 is a side view of the drive over conveyor pit of FIG. 7 in a raised position. As hydraulic cylinder 158 is extended, the pivoting action of linkage arms 162, 164 (linkage arms 164 not shown) causes a distance between cylinder mounting member 194 and cylinder linkage attachment 156 to increase. The result of the above described pivoting action is that tires 64 are lowered to the ground, and once tires 64 make ground contact, mainframe 12 rises with respect to tires 64. Continued pivoting action causes mainframe 12 to be lifted from the ground surface. A similar action occurs with rear wheel assembly 32 as is described above.

Figure 11:
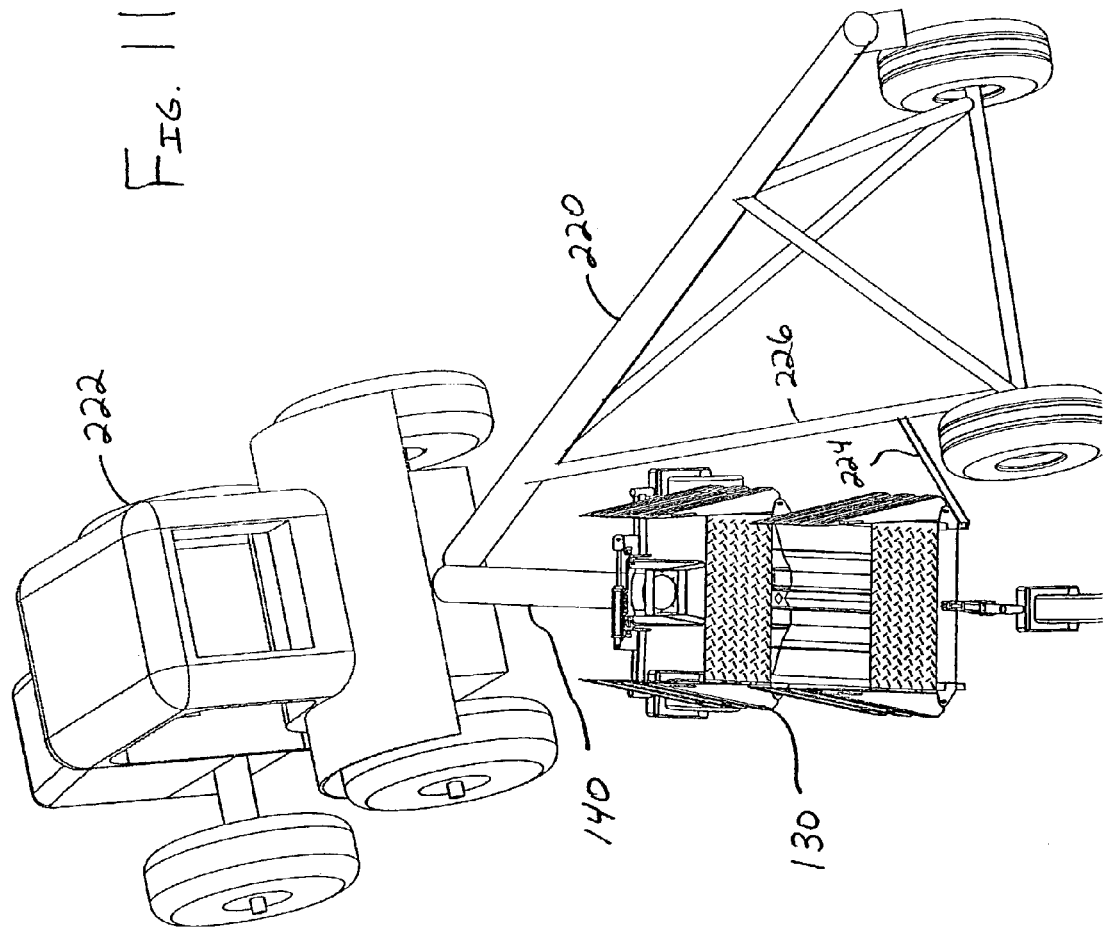
FIG. 11 is a rear view of a grain transfer system.

Attachment of feed chute 140 to a grain auger further provides a means for transport of pit 130 (shown in FIG. 6) as shown in FIG. 11. FIG. 11 is a rear view depicting simultaneous transport of a grain auger 220 and drive over conveyor pit 130 using a single tractor 222 or other vehicle, providing a user with a grain transfer system. A track bar 224 is attached between pit 130 and a frame member 226 of auger 220. Track bar 224 allows pit 130 to travel substantially parallel to and alongside auger 220. In one embodiment, track bar 224 is a telescoping bar. Such a towing arrangement provides a convenience to a user as additional mechanical connections between grain auger 220 and feed chute 140 of drive over pit 130 at tractor 222 are the same connections as used when transferring grain. As used herein, the term grain auger, includes, but is not limited to, screw-type augers, belt conveyors, chain conveyors and other implements which are configured for the transfer of grain or other bulk commodities as described herein with respect to grain auger 220.

Configuration of pit 130 with front lift assembly 30 (shown in FIG. 2), rear lift assembly 90 (shown in FIG. 5), and transition housing 28 (shown in FIG. 1) provides means for towing pit 130 while connected to grain auger 220. Further, pit 130 can be towed without having to configure pit 130 with a trailer hitching arrangement as in known drive over conveyor pits. Still further, pit 130, incorporating either lift assemblies 30 and 90, or lift assemblies 152 and 90, and configurable for towing while mechanically connected to grain auger, provides a user with a safe transport arrangement, as the pit 130 and grain auger 220 combination is only slightly wider than typical tractors and vehicles used for towing such devices.

Figure 12:
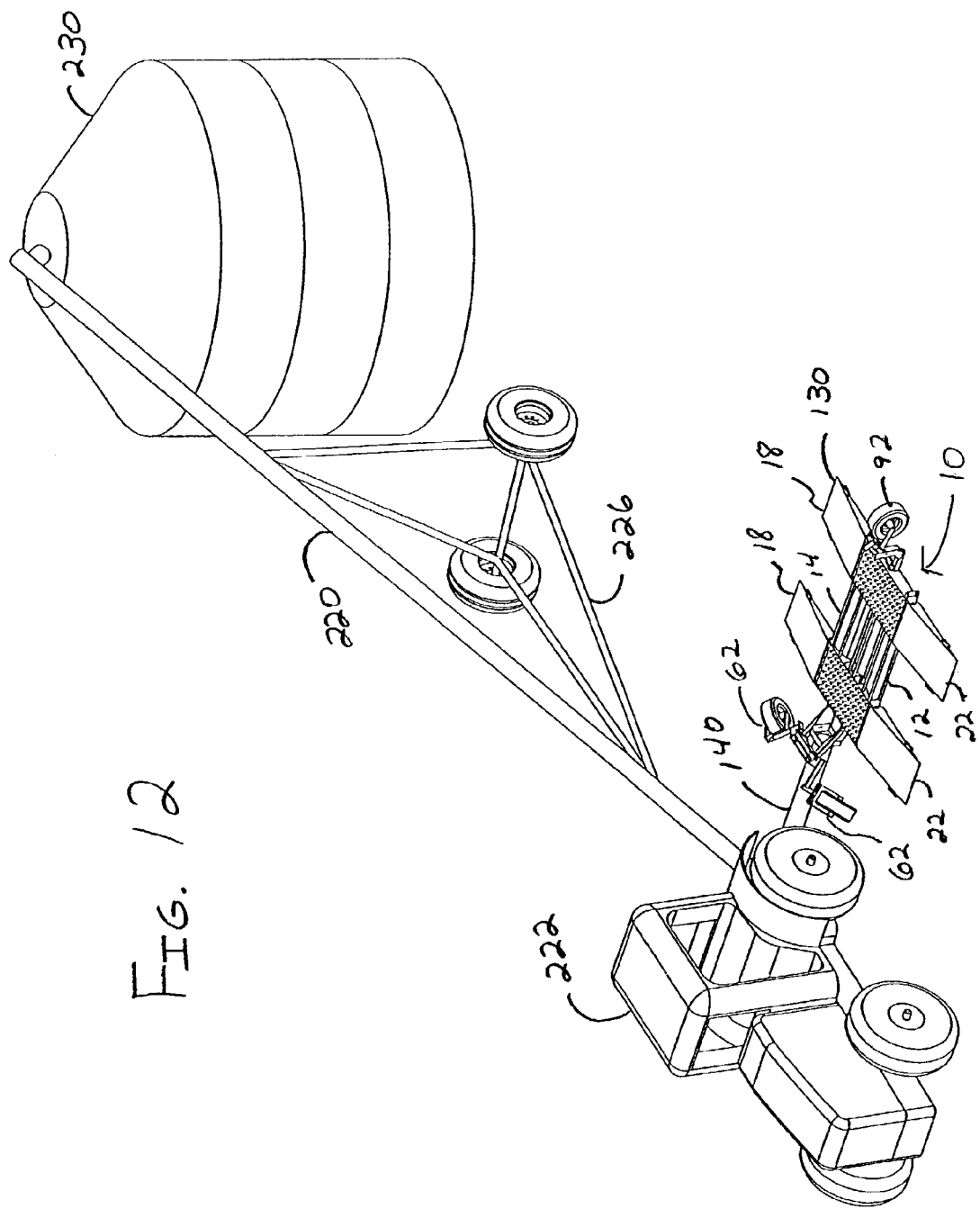
FIG. 12 is a view of the grain transfer system of FIG. 11 in an operating position at a grain bin.

FIG. 12 is a view of the grain transfer system in an operating position at a grain bin 230. Track bar 224 (shown in FIG. 11) has been removed and auger 220 and drive over conveyor pit 10 are positioned for use. A trailer (not shown) which has a load of grain is able to approach and drive over ramps 18 and ramps 22 and position the bottom hopper (not shown) of the trailer over grain pit 14. Also shown are tires 62 and 92 raised and pivoted away from mainframe 12, allowing the trailer to pass unobstructed.

Figure 13:
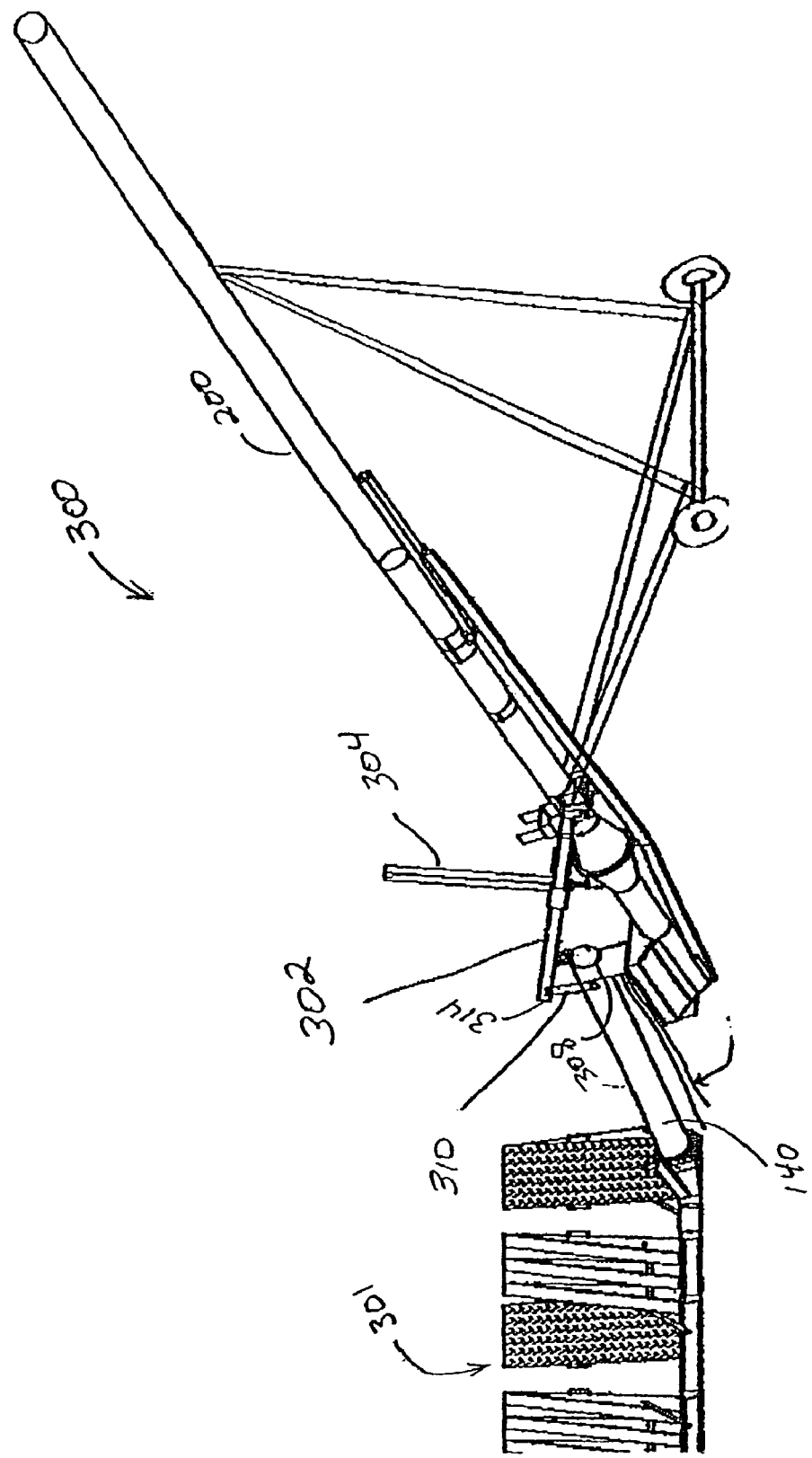
FIG. 13 is a view of another grain transfer system.

FIG. 13 illustrates another embodiment of a grain auger system 300. System 300 includes a driver over pit 301 and a grain auger 200. Pit 301 further includes a mechanical linkage 302 utilized to raise drive over pit 301 above a portion of grain auger 200 for transport. Mechanical linkage 302 is operated, in one embodiment, by a hydraulic cylinder 304 between a discharge end 308 of feed chute 140 of grain auger 200 and pit 301. Mechanical linkage 302 is mechanically connected to feed chute 140 with a connecting strap 310, which helps to enable movement of pit 301 to a position above auger 200. In one embodiment, hydraulic cylinder 304 is actuated by a tractor hydraulic system (not shown).

Figure 14:
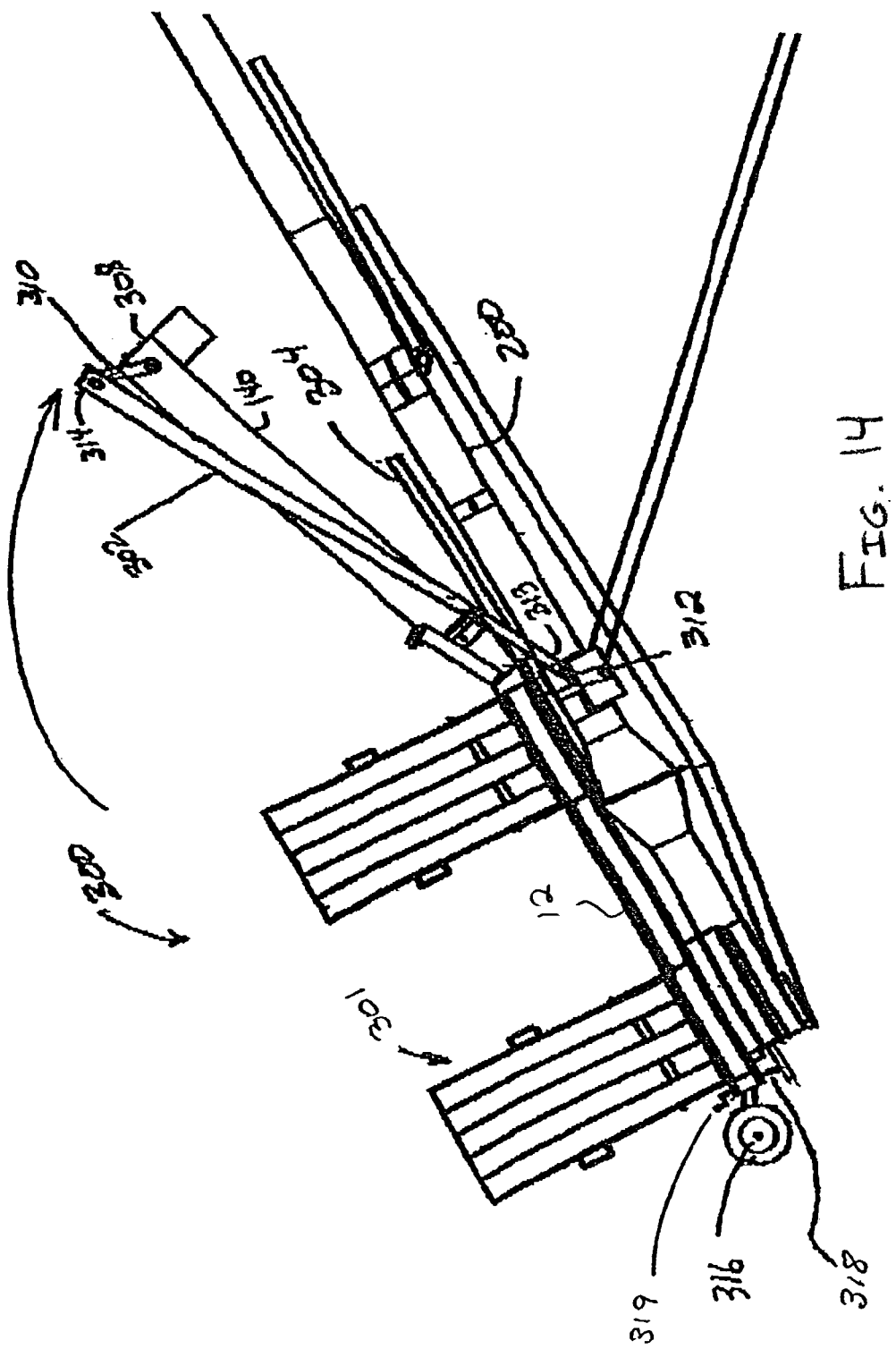
FIG. 14 is a view of the grain transfer system of FIG. 13 showing a drive over conveyor pit positioned above a portion of a grain auger.

Referring to FIG. 14, mechanical linkage 302 is attached to auger 200 utilizing a pivot pin 312 connected at a first end 313 of linkage 302. Operation of hydraulic cylinder 304 with, for example, a tractor hydraulic system, causes a second end 314 of linkage 302 to move in a circular arc, causing either a raising of pit 301 to a position above a portion of auger 200 for transport, or a lowering of pit 301 to an operating position. Wheel 316 is attached to pit 301 at an end opposite feed chute 140 and mechanical linkage 302 for assistance with such movement. Drive over conveyor pit 301 is shown in a fully raised position on top of grain auger 200. In one embodiment, a latch mechanism 318 is used to secure pit 301 on top of auger 200 for road transport. In one specific embodiment, latch mechanism 318 includes a pin 319 which is inserted through openings in each of mainframe 12 and auger 200.

FIG. 15 further illustrates operation of mechanical linkage 302 as drive over conveyor pit 301 is shown in a partially raised position. Linkage 302, when operated upon by hydraulic cylinder 304, serves to lift feed chute 140, and consequently a portion of drive over conveyor pit 301 over auger 200. Another portion of pit 301 rests on wheel assembly 316, which rolls toward auger 200 as mechanical linkage 302 continues to travel in the circular arc. As mechanical linkage 302 completes travel, pit 301 assumes a position substantially parallel to an auger conveyor 320 of auger 200, and is ready for transport.

FIG. 16 is a side view of drive over conveyor pit 301 illustrating a hitching mechanism 340. Hitching mechanism 340 is mechanically attached to pit 301 at the end opposite feed chute 140 (not shown in FIG. 16). Hitching mechanism 340 is configured to attach to a towing vehicle, for example, a three point hitch of a tractor, and thereby enables transport of both pit 301 and auger 220 utilizing a single tow vehicle.

The incorporation of hydraulics to raise and lower mainframe 12 of drive over conveyor pits provides a simple to use drive over grain movement solution without the drawback of tire removal or jacking as in some known drive over conveyor pits, and without the manual positioning as required in other known swing auger hoppers. Further, the hydraulics incorporated in the drive over conveyor pit provide an easy setup between transport position and operating position in a short period of time. While the invention has been described in terms of various specific embodiments, those skilled in the art will recognize that the invention can be practiced with modification within the spirit and scope of the claims.

What is claimed is:

1. A grain transfer system comprising:
   a drive over conveyor pit; and
   a grain auger comprising a feed chute, said drive over conveyor pit comprising:
   a mainframe comprising:
   a plurality of drive over sections each comprising a first end and a second end;
   a grain pit located between and adjacent to said plurality of drive over sections;
   a front, configured to be attached to said feed chute; and
   a rear;
   entrance and exit ramps pivotably attached to said drive over sections;
   a hydraulic front lift assembly attached to said front of said mainframe;
   a hydraulic rear lift assembly attached to said rear of said mainframe; and a track bar, said auger comprising a frame member, said track bar configured to be attached between said drive over conveyor pit and said frame member, said track bar configuring said system to allow said pit and said auger to be towed substantially parallel to one another using a single vehicle.

2. A grain transfer system according to claim 1 wherein said hydraulic front lift assembly and said hydraulic rear lift assembly are configured to allow said mainframe to be lowered to a surface.

3. A grain transfer system according to claim 2 wherein said hydraulic front lift assembly and said hydraulic rear lift assembly are configured to lift and pivot when said mainframe contacts the surface.

4. A grain transfer system according to claim 1 wherein said hydraulic front lift assembly and said hydraulic rear lift assembly comprise tires mounted on caster wheel assemblies.

5. A grain transfer system according to claim 4 wherein for said hydraulic front lift assembly said caster wheel assemblies are rotatably mounted to an axle frame, said axle frame pivotably mounted to a transition housing attached to said mainframe.

6. A grain transfer system according to claim 5 wherein said hydraulic front lift assembly comprises:
 a first caster wheel assembly;
 a second caster wheel assembly;
 a left axle frame; and
 a right axle frame, said first caster wheel assembly rotatably mounted to said left axle frame, said second caster wheel assembly rotatably mounted to said right axle frame, said left axle frame and said right axle frame pivotably mounted to opposite sides of said transition housing.

7. A grain transfer system according to claim 2 wherein said hydraulic front lift assembly comprises:
 an axle assembly;
 a cylinder linkage attachment;
 a hydraulic cylinder extending between and attached to said axle assembly and said cylinder linkage attachment;
 a transition housing configured to be attached to a mainframe of the drive over conveyor pit;
 a plurality of caster wheel assemblies configured to be rotatably mounted to said axle assembly, said caster wheel assemblies mounted at ends of said axle assembly;
 a plurality of tires, a respective said tire mounted to a respective said caster wheel assembly; and
 a plurality of linkage arms, said linkage arms pivotably attached to said axle assembly and said transition housing, at least one of said linkage arms also being attached to said cylinder linkage attachment, such that retracting said hydraulic cylinder causes a distance between said axle assembly and said cylinder linkage attachment to decrease due to the pivoting of said linkage arms, causing the mainframe to lower with respect to said tires, and such that extending said hydraulic cylinder causes a distance between said axle assembly and said cylinder linkage attachment to increase due to the pivoting of said linkage arms, causing the mainframe to rise with respect to said tires.

8. A grain transfer system according to claim 7 wherein said axle assembly comprises:
 a main member comprising a center portion, a first end, and a second end a left extension comprising a first end extending from said first end of said center portion and a second end comprising a sleeve for mounting of said caster wheel assembly;
 a right extension comprising a first end extending from said second end of said center portion and a second end comprising a sleeve for mounting of a second caster wheel assembly;
 a cylinder mounting member which extends from said center portion of said main member, said cylinder mounting member comprising a mounting hole for mounting said hydraulic cylinder and configured to extend upward from said center portion; and
 a pair of linkage arm attachment members which extend from said main member, one said linkage arm attachment member extending from said main member near said first end, and another said linkage arm attachment member extending from said main member near said second end, said linkage arm attachment members extending at an angle from said main member and including a pair of holes therethrough to which said linkage arms are pivotably attached.

9. A grain transfer system comprising:
 a drive over conveyor pit comprising a frame, a hydraulic front lift assembly, and a hydraulic rear lift assembly, said front lift assembly and said rear lift assembly configured to raise and pivot away from said frame when said frame is lowered onto a surface;
 a grain auger comprising a frame member; and
 a track bar configured to be attached between said drive over conveyor pit and said frame member, said track bar configuring said system to allow said pit and said auger to be towed substantially parallel to one another using a single vehicle.

10. A grain transfer system according to claim 9 wherein said front lift assembly comprises:
 an axle assembly;
 a cylinder linkage attachment;
 a hydraulic cylinder extending between and attached to said axle assembly and said cylinder linkage attachment;
 a transition housing configured to be attached to said frame of said drive over conveyor pit;
 a plurality of caster wheel assemblies configured to be rotatably mounted to said axle assembly, said caster wheel assemblies mounted at ends of said axle assembly;
 a plurality of tires, a respective said tire mounted to a respective said caster wheel assembly; and
 a plurality of linkage arms, said linkage arms pivotably attached to said axle assembly and said transition housing, at least one of said linkage arms also being attached to said cylinder linkage attachment, such that retracting said hydraulic cylinder causes a distance between said axle assembly and said cylinder linkage attachment to decrease due to the pivoting of said linkage arms, causing said frame to lower with respect to said tires, and such that extending said hydraulic cylinder causes a distance between said axle assembly and said cylinder linkage attachment to increase due to the pivoting of said linkage arms, causing said frame to rise with respect to said tires.

11. A grain transfer system according to claim 9 wherein said axle assembly comprises:
 a main member comprising a center portion, a first end, and a second end a left extension comprising a first end extending from said first end of said center portion and a second end comprising a sleeve for mounting of said caster wheel assembly;

a right extension comprising a first end extending from said second end of said center portion and a second end comprising a sleeve for mounting of a second caster wheel assembly;

a cylinder mounting member which extends from said center portion of said main member, said cylinder mounting member comprising a mounting hole for mounting said hydraulic cylinder and configured to extend upward from said center portion; and a pair of linkage arm attachment members which extend from said main member, one said linkage arm attachment member extending from said main member near said first end, and another said linkage arm attachment member extending from said main member near said second end, said linkage arm attachment members extending at an angle from said main member and including a pair of holes therethrough to which said linkage arms are pivotably attached.

12. A grain transfer system according to claim 11 wherein said linkage arm attachment members extend from said main member at an angle between 90 and 180 degrees from said cylinder mounting member.

* * * * *

UNITED STATES PATENT AND TRADEMARK OFFICE
CERTIFICATE OF CORRECTION

PATENT NO. : 7,063,497 B2
APPLICATION NO. : 10/361050
DATED : June 20, 2006
INVENTOR(S) : Mast et al.

It is certified that error appears in the above-identified patent and that said Letters Patent is hereby corrected as shown below:

Title Page  # 22
Filed: delete "Feb. 6, 2003" and insert therefore -- Feb. 7, 2003 --.

Signed and Sealed this

Twenty-second Day of August, 2006

JON W. DUDAS
*Director of the United States Patent and Trademark Office*